United States Patent [19]
Doueihi et al.

[11] Patent Number: 4,529,932
[45] Date of Patent: Jul. 16, 1985

[54] ELECTRONIC SPEED SENSOR

[75] Inventors: Mikhael S. Doueihi, Peoria; Kenneth W. Gay, East Peoria, both of Ill.

[73] Assignee: Caterpillar Tractor Co., Peoria, Ill.

[21] Appl. No.: 502,782

[22] Filed: Jun. 9, 1983

[51] Int. Cl.³ .............................................. G01P 3/56
[52] U.S. Cl. ..................................... 324/161; 324/174
[58] Field of Search ................ 324/161, 174; 361/240; 364/565

[56] References Cited

U.S. PATENT DOCUMENTS 3,500,375 3/1970 Klimo ........................... 324/161 X
3,599,154 8/1971 Carol, Jr. et al. ............... 324/161 X
3,757,167 9/1973 Yoshikawa et al. .............. 361/240
4,199,719 4/1980 Grob .................................. 324/166
4,218,879 8/1980 Hagrman et al. ............... 361/240 X Primary Examiner—Stanley T. Krawczewicz
Attorney, Agent, or Firm—Terry D. Morgan

[57] ABSTRACT

A speed sensing apparatus (10) counts a predetermined number of gear teeth (18) on a gear (16) driven by a motor (8). The duration of time required to count the predetermined number of gear teeth (18) is compared to a timing signal of preselected duration. The comparison is used to make a determination as to whether the velocity of the gear is above or below a preselected velocity.

13 Claims, 1 Drawing Figure

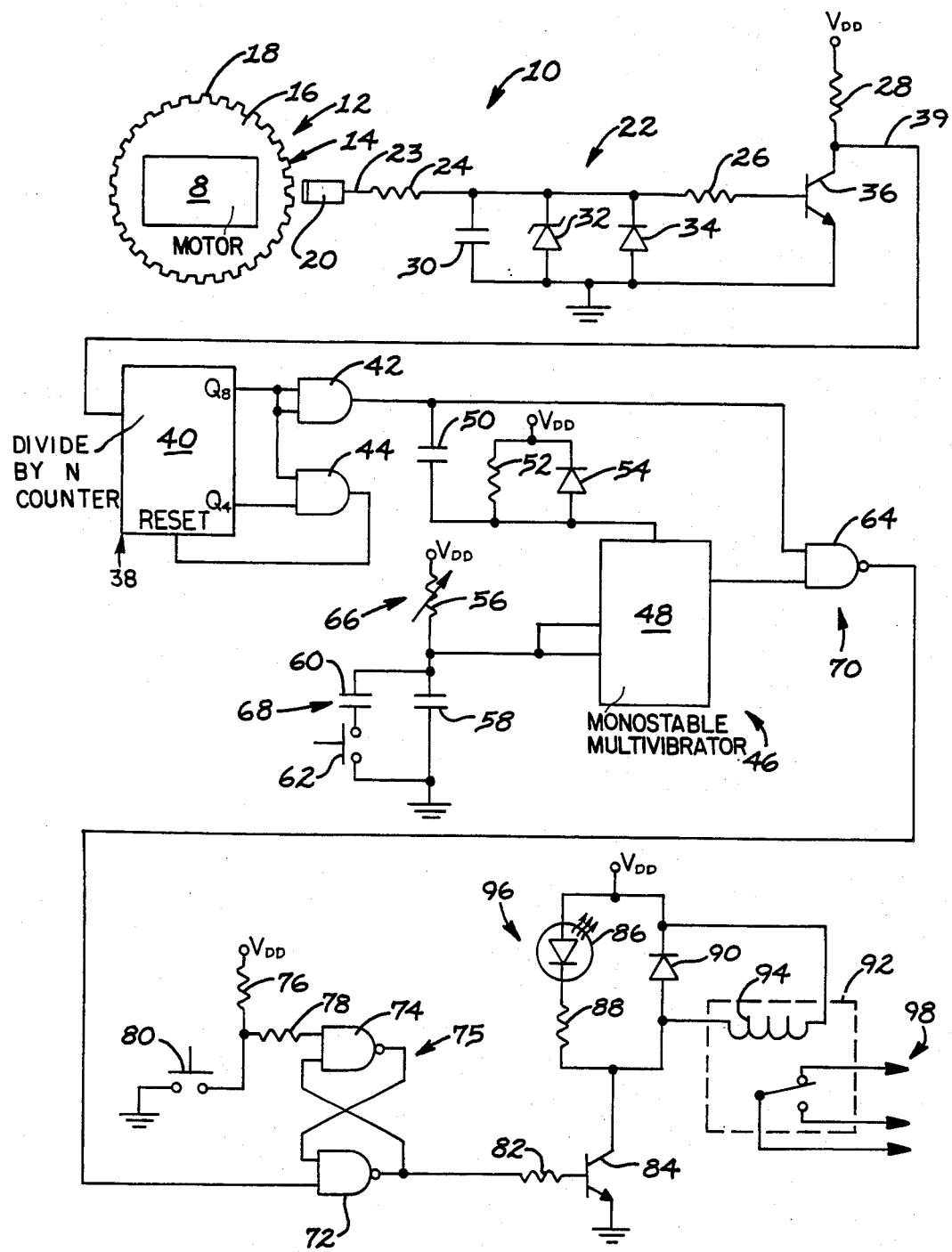

ELECTRONIC SPEED SENSOR

DESCRIPTION

1. Technical Field

This invention relates generally to an apparatus for sensing the velocity of a moveable member, such as a gear, and more particularly to an apparatus which compares the sensed velocity to a reference velocity and delivers a controlling signal in response to the comparison.

2. Background Art

Previous gear speed sensors typically determine velocity by counting pulses representative of gear teeth for a preselected duration of time. While this method is relatively simple to implement electronically, it does suffer from an inherent disadvantage of decreased accuracy at high or low operational speeds. For example, a small change in velocity at high gear speed will result in a difference of only a few pulses while at low gear speeds this same change in velocity will be insufficient to produce a different pulse count and, although actual speed has changed, the measured speed is unaffected.

Additionally, at low gear speeds a relatively small sampling of gear teeth will be taken, leading to erroneous gear speeds being measured. These errors are induced by the torsional effect caused by the firing of each cylinder of an engine. If an adequate number of gear teeth are counted in a sample period, then the torsional effects will be averaged out. However, where the sample period is sufficiently short to occur within an acceleration or deceleration of the gear, caused by the firing of a single cylinder, then an erroneously high or low gear speed is measured.

Alternatively, at high gear speeds a relatively large sampling of gear teeth will be taken, resulting in an average speed that does not adequately reflect transitions in gear speed. At these higher speeds, major changes in gear speed can occur rapidly and cause damage to the engine. If the sampling of gear teeth is large, then these transitions will be averaged out or, at best, detection can be delayed sufficiently to allow overspeed damage to occur.

Subsequent gear speed sensors have attempted to overcome this disadvantage by developing an apparatus that has a sampling time which is inversely proportional to the gear speed. In this way the range of accuracy has been greatly extended, but the attractive simplicity of the previous apparatus has been foregone for a gear speed sensor that is unduly complicated and constructed from a myriad of components. Each of these components is subject to failure, thereby endangering the reliability of the entire apparatus.

The present invention is directed to extending the range of accuracy of the gear speed sensor without inordinately complicating the apparatus.

DISCLOSURE OF THE INVENTION

In accordance with one aspect of the present invention, a speed sensing apparatus is provided for measuring the velocity of a moveable member having at least one protuberance. The speed sensing apparatus has a sensor adjacent the moveable member and delivers a first signal in response to the protuberance moving past the sensor. Additionally, a counting means receives the first signal and delivers a second signal in response to receiving a predetermined number of first signals from the sensor. A timing means receives said second signal and delivers a third signal for a preselected duration of time in response to receiving the second signal. Logic circuit means receives the second and third signals, compares the presence and absence of the second and third signals, and delivers a fourth signal in response to receiving a predetermined combination of the second and third signals.

In accordance with another aspect of the present invention, a method for measuring the speed of a moveable element having at least one protuberance includes delivering a series of first signals having a frequency directly related to the speed of the moveable element, counting the first signals and delivering a second signal in response to receiving a predetermined number of the first signals. The method further includes delivering a third signal of predetermined duration in response to receiving the second signal, and delivering a control signal in response to receiving the second signal while receiving the third signal.

BRIEF DESCRIPTION OF THE DRAWINGS

FIG. 1 is a schematic circuit diagram of one embodiment of the present invention.

BEST MODE FOR CARRYING OUT THE INVENTION

FIG. 1 illustrates a speed sensing apparatus 10 for measuring the velocity of a moveable member 12 having at least one protuberance 14. For example, the moveable member 12 can be a gear 16 having gear teeth 18 and being driven by a motor 8. A sensor 20 is disposed adjacent the moveable member 12 and delivers a first signal in response to the protuberance 14 moving past the sensor 20. This type of sensor 20 is well-known in the art and employs a permanent magnet and an inductive coil or hall effect device to sense a change in flux density as the gear teeth 18 move past the sensor 20. A signal with a frequency directly related to the speed of the moveable element is delivered by the sensor 20 to a signal shaping circuit 22 over the line 23.

The line 23 is connected to a resistor 24. The resistor 24 delivers the first signal to a capacitor 30, a zener diode 32, and a diode 34, all connected in parallel to ground. A resistor 26 is connected to the resistor 24 and delivers the first signal to the base of a transistor 36. The transistor 36 has its emitter connected to ground and its collector connected to system voltage $V_{DD}$ through a resistor 28. The collector is additionally connected to a counting means 38 by a line 39.

The counting means 38 receives the first signal and delivers a second signal in response to receiving a predetermined number of first signals. This counting means 38 includes a commercially available divide by N counter 40 and a pair of logical AND gates 42, 44. The input of the counter 40 is connected to the collector of transistor 36. The Q8 output of the counter 40 is connected to both inputs of the AND gate 42 and to one of the inputs of AND gate 44. The second input of the AND gate 44 is connected to the Q4 output of the counter 40 and the output of the AND gate 44 is delivered to the RESET of counter 40.

A timing means 46 receives the second signal from the counting means 38 and delivers a third signal for a preselected duration of time in response to receiving the second signal. The timing means 46 includes a commercially available monostable multivibrator 48 whose trigger input is connected through a capacitor 50 to the output of the AND gate 42. The trigger input is additionally connected to the system voltage $V_{DD}$ through a parallel connection of a resistor 52 and a diode 54. An input to the multivibrator 48 is connected to a first means 66 for altering the duration of delivery of the third signal. The first means includes a potentiometer 56 connected to system voltage $V_{DD}$ and to ground through a capacitor 58. The timing means 46 also includes a second means 68 for temporarily altering the duration of delivery of the third signal. This second means 68 is connected in parallel to the capacitor 58 and includes a switch 62 and a capacitor 60. The output of the multivibrator 48 is delivered to a logic circuit means 70. The logic circuit means 70 includes a NAND gate 64 having one input connected to the output of AND gate 42 and a second input connected to the output of the multivibrator 48. The output of the NAND gate 64 is connected to a first input of a pair of NAND gates 72,74 connected as a latch 75. The second input to the latch 75 is connected to system voltage $V_{DD}$ by a pair of resistors 76,78. A switch 80 is provided for resetting the latch 75 by grounding the second input of the latch 75.

The output of the latch 75 is connected to the base of a transistor 84 via a resistor 82. When biased on, the transistor 84 conducts current from system voltage $V_{DD}$ through a light emitting diode 86 and a resistor 88. Current is additionally conducted through a coil 94 of a relay 92 in parallel with the resistor 88 and LED 86. For example, the LED 86 is used as an annunciator 96, to indicate an overspeed condition, the relay is used as an engine shutdown device 98 by providing power to a solenoid to shut off fuel supplied to the engine.

A number of timer circuits and logic circuits similar to those shown here can be operated from the output of the AND gate 42 to provide a number of different speed level sensors, all using the same sensor 20, signal shaping circuit 22, and counting means 38.

INDUSTRIAL APPLICABILITY

The operation of the circuit shown in FIG. 1 will now be described with reference to application in determining the speed of rotation of an engine drive gear of a work vehicle. Rotation of the gear 10 results in a varying flux density being detected by the sensor 20 as the gear teeth 18 move past the sensor 20. The sensor 20 responds to the varying flux density by supplying a signal of varying voltage. This varying voltage is applied to the base of the transistor 36, thereby alternately biasing the transistor 36 "off" and "on". When the transistor 36 is biased "off", system voltage is delivered to the input of the divide by N counter 40; correspondingly, when the transistor 36 is biased "on", a signal approximating ground is delivered to the counter 40.

As these pulses are received by the counter 40 an 8-bit binary number, representative of the number of pulses delivered, is available as outputs from the counter 40. By selecting the Q8 output as the input to the AND gate 42, a logically "high" signal is delivered during the period from (10000000) 128 pulses until (10001000) 136 pulses. At the 136th pulse, both the Q8 and Q4 outputs are logically "high", thereby causing the AND gate 44 to deliver a reset signal to the counter 40.

The "high" to "low" transition at the output of the AND gate 42 causes a trigger signal to be delivered to the monostable multivibrator 48, resulting in the multivibrator 48 delivering a pulse of predetermined duration. The duration of the pulse is determined by the time constant of the RC circuit 56,58,60,62 connected at the multivibrator's input. The potentiometer 56 is utilized for adjustment of the duration of the output signal by changing the time constant of the RC circuit 56,58,60,62. Additionally, if the switch 62 is held closed, then the capacitor 60 is added to the capacitor 58, thereby lengthening the time constant of the RC circuit 56,58,60,62 and, consequently, increasing the duration of the output pulse.

Should the counting means 38 receive 128 pulses before the multivibrator 48 has timed out, then the NAND gate 64 will deliver a logically "low" signal to the latch 75 in response to receiving the logically "high" signals from both the multivibrator 48 and the AND gate 42. The latch 75 responds by biasing the transistor 84 "on", providing a path for current to flow through the LED 86 and the coil 94 of the relay 92.

The relay 92 can be used to activate a variety of engine shutdown devices or warning devices, any of which are well-known to those skilled in the art. This condition is indicative of a detected engine speed being greater than a desired limit and the latch 75 continues to bias the transistor 84 "on" even if engine speed falls below the desired limit. Closing the switch 80 provides a logically "low" signal to the latch 75 resetting its output and biasing the transistor 84 "off".

If at this time the engine is running below the desired speed limit, the multivibrator 48 will time out before the timing means 38 receives 128 pulses and the NAND gate 64 will not set the latch 75 to bias the transistor 84 "on".

It can now be appreciated that the potentiometer 56 assists the speed sensing apparatus 10 in detecting any of a plurality of engine speeds by varying the duration of the multivibrator's output. The switch 62 and capacitor 60 provides a means for testing the operation of the device without exceeding possibly critical speed limits. As described earlier, while the switch 62 is closed, the duration of the output from the multivibrator 48 is lengthened such that the desired speed limit is temporarily reduced allowing an overspeed condition to occur at a speed less than during normal operation (i.e., when the switch 62 is open).

It is easily recognized, by those skilled in the art, that minor changes to the logic circuit means 70 allows the apparatus 10 to detect engine speeds at a level less than a predetermined value without departing from the spirit of the intended invention.

Other aspects, objects, and advantages of this invention can be obtained from a study of the drawings, the disclosure, and the appended claims.

We claim:

1. A speed sensing apparatus (10) for measuring the velocity of a moveable member (12) having at least one protuberance (14), said speed sensing apparatus (10) having a sensor (20) adjacent said moveable member (12) for delivering a first signal in response to said protuberance (14) moving past said sensor (20), the improvement comprising:

counting means (38) for receiving said first signal and delivering a second signal in response to receiving a predetermined number of said first signals from said sensor (20);

timing means (46) for receiving said second signal and delivering a third signal in response to receiving said second signal, said third signal being delivered for a preselected duration of time; and, logic circuit means (70) for receiving said second and third signals, comparing the presence and absence of said second and third signals, and delivering a fourth signal in response to receiving a predetermined combination of said second and third signals, said fourth signal being a controlling signal responsive to the sensed velocity of said moveable member (12).

2. A speed sensing apparatus (10), as set forth in claim 1, wherein said fourth signal is delivered in response to said logic circuit means (70) receiving said second and third signals concurrently.

3. A speed sensing apparatus (10), as set forth in claim 1, including an annunciator (96) connected to said logic circuit means (70) and adapted to receive said fourth signal.

4. A speed sensing apparatus (10), as set forth in claim 1, including an engine shutdown device (98) connected to said logic circuit means (70) and adapted to receive said fourth signal.

5. A speed sensing apparatus (10), as set forth in claim 4, wherein said logic circuit means (70) includes a logical NAND gate (64).

6. A speed sensing apparatus (10), as set forth in claim 1, wherein said timing means (46) includes a first means (66) for altering the duration of delivery of said third signal.

7. A speed sensing apparatus (10), as set forth in claim 6, wherein said first means (66) is a potentiometer (56).

8. A speed sensing apparatus (10), as set forth in claim 6, wherein said timing means (46) includes a second means (68) for temporarily altering the duration of delivery of said third signal.

9. A speed sensing apparatus (10), as set forth in claim 8, wherein said second means (68) includes a switch (62) and a capacitor (60).

10. A speed sensing apparatus (10) for measuring the velocity of a moveable member (12) having at least one protuberance (14), said speed sensing apparatus (10) having a sensor (20) adjacent said moveable member (12) for delivering a first signal in response to said protuberance (14) moving past said sensor (20), the improvement comprising:
    counting means (38) for receiving said first signal and delivering a second signal in response to receiving a predetermined number of said first signals from said sensor (20);
    timing means (46) for receiving said second signal and delivering a third signal in response to receiving said second signal, said third signal being delivered for a preselected duration of time;
    first means for altering the duration of delivery of said third signal; and,
    logic circuit means (70) for receiving said second and third signals, comparing the presence and absence of said second and third signals, and delivering a fourth signal in response to receiving a predetermined combination of said second and third signals, said fourth signal being a controlling signal responsive to the sensed velocity of said moveable member (12).

11. A speed sensing apparatus (10), as set forth in claim 10, wherein said timing means (46) includes a second means (68) for temporarily altering the duration of delivery of said third signal.

12. A speed sensing apparatus (10), comprising:
    a motor (8);
    a gear (16) rotatably connected to said motor (8), said motor (8) being adapted to drive said gear (16) at a multiplicity of speeds;
    a sensor (20) mounted adjacent said gear (16), said sensor (20) being adapted for delivering a first signal in response to rotation of said gear (16);
    counting means (38) for receiving said first signal and delivering a second signal in response to receiving a predetermined number of said first signals;
    timing means (46) for receiving said second signal and delivering a third signal in response to receiving said second signal, said third signal being delivered for a preselected duration of time;
    first means (66) for altering the duration of delivery of said third signal, said first means having a potentiometer (56); and,
    logic circuit means (70) for receiving said second and third signals, comparing the presence and absence of said second and third signals, and delivering a fourth signal in response to receiving a predetermined combination of said second and third signals, said fourth signal being a controlling signal responsive to the sensed velocity of said gear (16).

13. A method for measuring the speed of a moveable element having at least one protuberance, comprising:
    delivering a series of first signals having a frequency directly related to the speed of said moveable element;
    counting said first signals and delivering a second signal in response to receiving a predetermined number of said first signals;
    delivering a third signal of predetermined duration in response to receiving said second signal; and,
    delivering a control signal in response to receiving said second signal while receiving said third signal.

* * * * *